United States Patent
Maalouf et al.

(10) Patent No.: US 10,516,284 B2
(45) Date of Patent: Dec. 24, 2019

(54) VOLTAGE CONTROLLED CHARGE PUMP AND BATTERY CHARGER

(71) Applicant: QUALCOMM Incorporated, San Diego, CA (US)

(72) Inventors: Joseph Maalouf, San Diego, CA (US); Sumukh Shevde, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/633,561

(22) Filed: Jun. 26, 2017

(65) Prior Publication Data

US 2018/0076635 A1    Mar. 15, 2018

Related U.S. Application Data

(60) Provisional application No. 62/395,208, filed on Sep. 15, 2016.

(51) Int. Cl.
| | |
|---|---|
| *H02J 7/06* | (2006.01) |
| *H02J 7/00* | (2006.01) |
| *H02M 3/07* | (2006.01) |
| *H02J 50/12* | (2016.01) |

(52) U.S. Cl.
CPC .............. *H02J 7/008* (2013.01); *H02M 3/07* (2013.01); *H02J 50/12* (2016.02)

(58) Field of Classification Search
CPC ........ H02J 7/008; H02J 7/0072; H02J 7/0031; H02J 7/0068; H02J 7/022
See application file for complete search history.

(56) References Cited

U.S. PATENT DOCUMENTS

| | | | |
|---|---|---|---|
| 7,612,603 B1* | 11/2009 | Petricek ................. | H02M 3/07 307/109 |
| 2001/0038275 A1* | 11/2001 | Hanada ................... | H02J 7/345 320/118 |
| 2002/0051372 A1* | 5/2002 | Hoshino ................. | H02M 3/07 363/60 |

(Continued)

FOREIGN PATENT DOCUMENTS

| | | |
|---|---|---|
| CN | 205160389 U | 4/2016 |
| DE | 102006044058 A1 | 4/2008 |
| WO | 0171895 A2 | 9/2001 |

OTHER PUBLICATIONS

International Search Report and Written Opinion—PCT/US2017/049686—ISA/EPO—dated Nov. 21, 2017.

*Primary Examiner* — Arun C Williams
(74) *Attorney, Agent, or Firm* — Patterson & Sheridan, LLP

(57) ABSTRACT

Certain aspects of the present disclosure relate to methods and apparatus for a voltage controlled charge pump and battery charger. Certain aspects of the present disclosure provide a method for operating a voltage controlled charge pump. The method includes selectively opening and closing a plurality of switches based on a voltage on a feedback path. The plurality of switches are coupled between a voltage input terminal and a voltage output terminal. A first capacitor is coupled between at least a first switch and a second switch of the plurality of switches. A second capacitor is coupled to the voltage output terminal. The feedback path is coupled to at least one of the voltage output terminal, the first capacitor, and the second capacitor.

26 Claims, 11 Drawing Sheets

(56) References Cited

U.S. PATENT DOCUMENTS

| | | | |
|---|---|---|---|
| 2003/0174524 A1* | 9/2003 | Botker | H02M 3/07 363/60 |
| 2005/0093512 A1 | 5/2005 | Mader et al. | |
| 2005/0146904 A1* | 7/2005 | Smeets | H02M 3/07 363/59 |
| 2005/0185361 A1* | 8/2005 | Yano | H02J 7/0016 361/328 |
| 2007/0103994 A1 | 5/2007 | Ahmed et al. | |
| 2008/0031023 A1* | 2/2008 | Kitagawa | H02M 3/07 363/59 |
| 2009/0224743 A1* | 9/2009 | Bairanzade | H02M 3/07 323/293 |
| 2012/0194141 A1* | 8/2012 | Shi | H02M 3/157 320/137 |
| 2012/0326771 A1* | 12/2012 | MacFarlane | H02M 3/07 327/536 |
| 2013/0300385 A1* | 11/2013 | Li | H02M 3/07 323/271 |
| 2014/0009227 A1* | 1/2014 | Kay | H03F 1/0244 330/127 |
| 2014/0204617 A1* | 7/2014 | Itou | H02M 3/33507 363/17 |
| 2015/0028801 A1 | 1/2015 | Carobolante et al. | |
| 2015/0054345 A1 | 2/2015 | Monat et al. | |
| 2015/0171637 A1 | 6/2015 | Lee | |
| 2015/0188420 A1* | 7/2015 | Lin | H02M 3/07 327/536 |
| 2016/0336808 A1 | 11/2016 | Liu et al. | |

* cited by examiner

VOLTAGE CONTROLLED CHARGE PUMP AND BATTERY CHARGER

CROSS-REFERENCE TO RELATED APPLICATIONS

This application claims the benefit of U.S. Provisional Patent No. 62/395,208, filed Sep. 15, 2016. The content of the provisional application is hereby incorporated by reference in its entirety.

TECHNICAL FIELD

The present disclosure relates generally to power supply control, and in particular to a voltage controlled charge pump and battery charger.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, medical implants, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power transfer systems, for example, may allow users to charge and/or power electronic devices without physical, electrical connections, thus reducing the number of components required for operation of the electronic devices and simplifying the use of the electronic device.

Further, some electronic devices may not be battery powered, but it still may be beneficial to utilize wireless power transfer to power such devices. In particular, the use of wireless power may eliminate the need for cords/cables to be attached to the electronic devices, which may be inconvenient and aesthetically displeasing.

Different electronic devices may have different shapes, sizes, and power requirements. There is flexibility in having different sizes and shapes in the components (e.g., magnetic coil, charging plate, etc.) that make up a wireless power transmitter and/or a wireless power receiver in terms of industrial design and support for a wide range of devices

SUMMARY

Certain aspects of the present disclosure provide a voltage controlled charge pump. The voltage controlled charge pump includes a voltage input terminal. The voltage controlled charge pump further includes a voltage output terminal. The voltage controlled charge pump further includes a plurality of switches coupled between the voltage input terminal and the voltage output terminal. The voltage controlled charge pump further includes a first capacitor coupled between at least a first switch and a second switch of the plurality of switches. The voltage controlled charge pump further includes a second capacitor coupled to the voltage output terminal. The voltage controlled charge pump further includes a controller configured to selectively open and close the plurality of switches. The voltage controlled charge pump further includes a feedback path from at least one of the voltage output terminal, the first capacitor, and the second capacitor to the controller. The controller is configured to selectively open and close the plurality of switches based on a voltage on the feedback path.

Certain aspects of the present disclosure provide a voltage controlled battery charger. The voltage controlled battery charger includes a charge pump and a linear regulator coupled to an output of the charge pump. The linear regulator is configured to determine a voltage level of a battery. The linear regulator is further configured to set a limit of an output voltage of the charge pump based on the determined voltage level of the battery. The linear regulator is further configured to selectively apply the output voltage to the battery.

Certain aspects of the present disclosure provide a method for operating a voltage controlled charge pump. The method includes selectively opening and closing a plurality of switches based on a voltage on a feedback path. The plurality of switches are coupled between a voltage input terminal and a voltage output terminal. A first capacitor is coupled between at least a first switch and a second switch of the plurality of switches. A second capacitor is coupled to the voltage output terminal. The feedback path is coupled to at least one of the voltage output terminal, the first capacitor, and the second capacitor.

Certain aspects of the present disclosure provide a method for operating a voltage controlled battery charger. The method includes determining a voltage level of a battery. The method further includes setting a limit of an output voltage of a power supply based on the determined voltage level of the battery. The method further includes selectively applying the output voltage to the battery.

Certain aspects of the present disclosure provide a voltage controlled charge pump. The voltage controlled charge pump includes means for selectively opening and closing a plurality of switches based on a voltage on a feedback path. The plurality of switches are coupled between a voltage input terminal and a voltage output terminal. A first capacitor is coupled between at least a first switch and a second switch of the plurality of switches. A second capacitor is coupled to the voltage output terminal. The feedback path is coupled to at least one of the voltage output terminal, the first capacitor, and the second capacitor. The voltage controlled charge pump further includes means for selectively controlling the plurality of switches to couple the first capacitor between the voltage input terminal and the voltage output terminal in a charging mode, and to couple the first capacitor between a reference potential and the voltage output terminal in a discharging mode.

Certain aspects of the present disclosure provide a voltage controlled battery charger. The voltage controlled battery charger includes means for determining a voltage level of a battery. The voltage controlled battery charger further includes means for setting a limit of an output voltage of a power supply based on the determined voltage level of the battery. The voltage controlled battery charger further includes means for selectively applying the output voltage to the battery.

Certain aspects of the present disclosure provide a computer readable medium having instructions stored thereon for performing a method of operating a voltage controlled charge pump. The method includes selectively opening and closing a plurality of switches based on a voltage on a feedback path. The plurality of switches are coupled between a voltage input terminal and a voltage output terminal. A first capacitor is coupled between at least a first switch and a second switch of the plurality of switches. A second capacitor is coupled to the voltage output terminal. The feedback path is coupled to at least one of the voltage output terminal, the first capacitor, and the second capacitor.

Certain aspects of the present disclosure provide a computer readable medium having instructions stored thereon for performing a method of operating a voltage controlled battery charger. The method includes determining a voltage level of a battery. The method further includes setting a limit of an output voltage of a power supply based on the determined voltage level of the battery. The method further includes selectively applying the output voltage to the battery.

Certain aspects of the present disclosure provide a method for operating a voltage controlled charge pump. The method includes selectively operating the voltage controlled charge pump in a bypass mode wherein an output voltage of the voltage controlled charge pump substantially equals an input voltage of the voltage controlled charge pump. The method further includes selectively operating the voltage controlled charge pump in an active mode wherein the output voltage of the voltage controlled charge pump is controlled based on a comparison of a voltage indicative of the output voltage to a threshold voltage.

Certain aspects of the present disclosure provide a voltage controlled charge pump. The voltage controlled charge pump includes means for selectively operating the voltage controlled charge pump in a bypass mode wherein an output voltage of the voltage controlled charge pump substantially equals an input voltage of the voltage controlled charge pump. The voltage controlled charge pump further includes means for selectively operating the voltage controlled charge pump in an active mode wherein the output voltage of the voltage controlled charge pump is controlled based on a comparison of a voltage indicative of the output voltage to a threshold voltage.

Certain aspects of the present disclosure provide a method for operating a voltage controlled charge pump. The method comprises selectively operating the voltage controlled charge pump in a bypass mode wherein an output voltage of the voltage controlled charge pump substantially equals an input voltage of the voltage controlled charge pump. The method further comprises selectively operating the voltage controlled charge pump in an active mode wherein the output voltage of the voltage controlled charge pump is controlled based on a comparison of a voltage indicative of the output voltage to a threshold voltage.

Certain aspects of the present disclosure provide a voltage controlled charge pump. The voltage controlled charge pump includes means for selectively operating the voltage controlled charge pump in a bypass mode wherein an output voltage of the voltage controlled charge pump substantially equals an input voltage of the voltage controlled charge pump. The voltage controlled charge pump further includes means for selectively operating the voltage controlled charge pump in an active mode wherein the output voltage of the voltage controlled charge pump is controlled based on a comparison of a voltage indicative of the output voltage to a threshold voltage.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Figure 1:
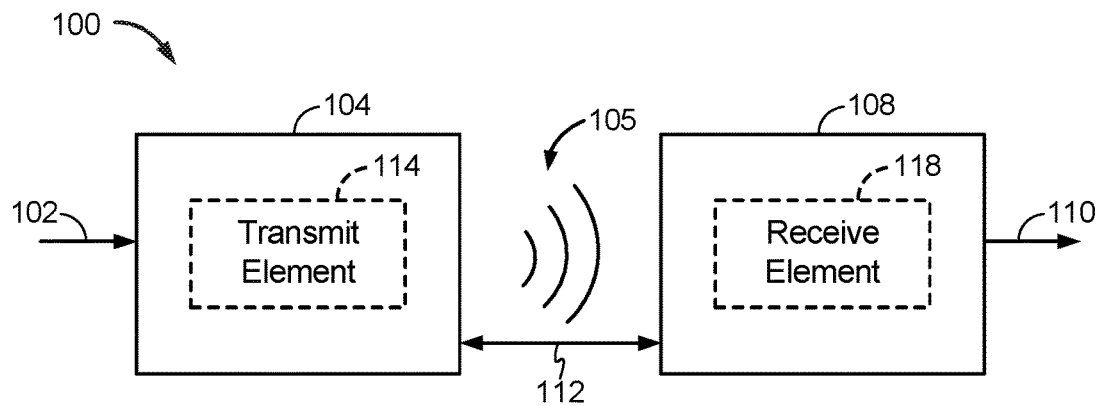
FIG. 1 is a functional block diagram of a wireless power transfer system in accordance with an illustrative aspect.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative aspect. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain aspects, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114. Conversely, the far field may correspond to a region that is greater than about one wavelength of the power transmitting element 114.

In certain aspects, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
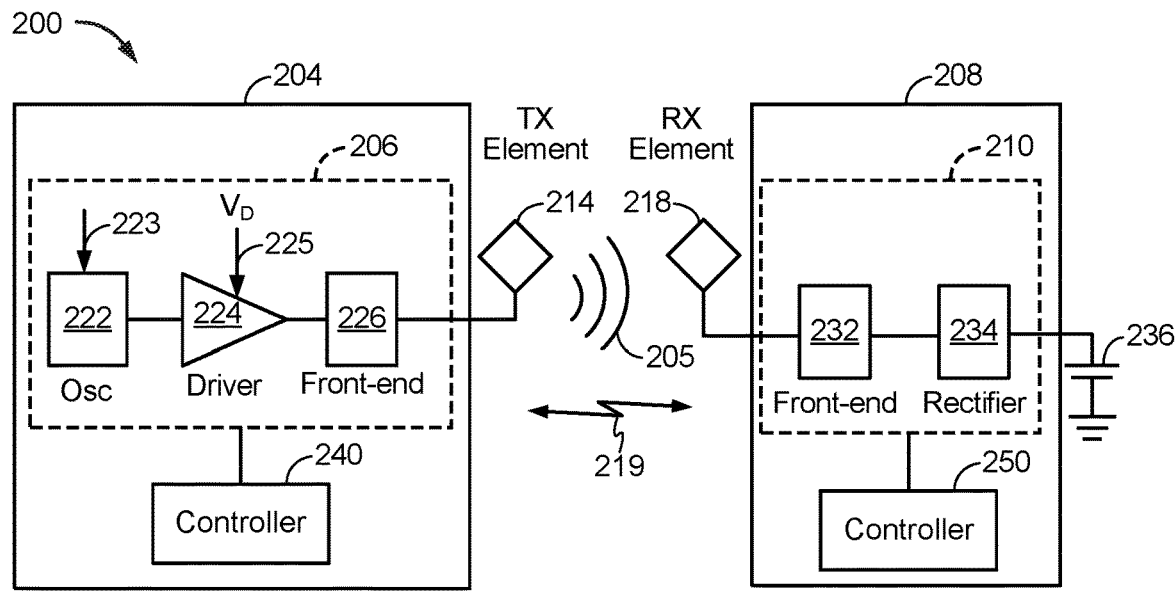
FIG. 2 is a functional block diagram of a wireless power transfer system in accordance with an illustrative aspect.

FIG. 2 is a functional block diagram of a wireless power transfer system 200, in accordance with another illustrative aspect. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal (e.g., an oscillating signal) at a desired frequency (e.g., fundamental frequency) that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output as a driving signal output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and an AC/DC converter (e.g., rectifier circuit 234). The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. Though certain aspects are described with respect to a rectifier, some such aspects may also use another type of AC/DC converter. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
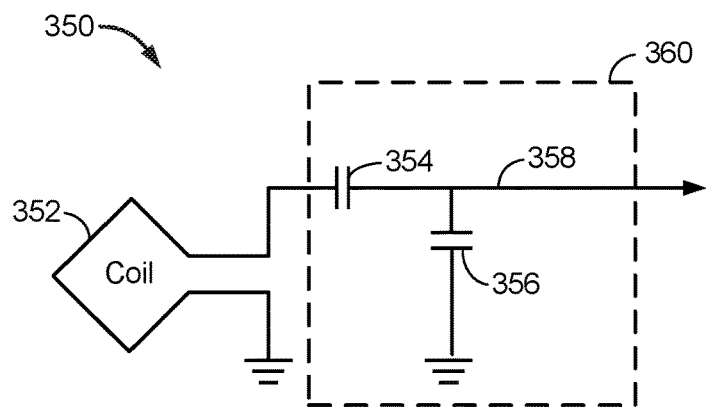
FIG. 3 is a schematic diagram of a portion of transmit circuitry or receive circuitry of FIG. 2 including a power transmitting or receiving element in accordance with an illustrative aspect.

FIG. 3 is a schematic diagram of a portion of the transmit circuitry 206 or the receive circuitry 210 of FIG. 2, in accordance with illustrative aspects. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some aspects, the tuning circuit in the front-end circuit 226 may have the same design (e.g., 360) as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

Although aspects disclosed herein may be used in systems related to resonant wireless power transfer, persons of ordinary skill will appreciate that aspects disclosed herein may be used in other non-resonant implementations for wireless power transfer, and in wired power applications. In particular, some aspects herein relate to a voltage controlled charge pump that can be used to limit the output voltage applied to a load (e.g., to charge a battery, a power management integrated circuit (PMIC), a device, etc.) based on an input voltage from a power supply (e.g., a wireless power receiver).

In certain aspects, the induced voltage at a wireless power receiver (e.g., receiver 208) due to a wireless field (e.g., wireless field 205 generated by a wireless power transmitter (e.g., transmitter 204) may vary. For example, the coupling between the wireless power receiver 208 and the wireless power transmitter 204 may change due to distance or material between the receiver 208 and the transmitter 204, leading to variations in induced voltage at the receiver 208.

Certain devices (e.g., charge ports of mobile devices, battery operated devices, etc.) may be configured to only accept a limited range of voltages (e.g., 4-10V, 4-12V, etc.). Since the induced voltage at the receiver 208 may vary due to the variable mutual inductance between the transmitter 204 and the receiver 208, circuits may be used to scale the voltage of the receiver 208. For example, in certain aspects, the receiver 208 includes a voltage controlled charge pump comprising a plurality of switches coupled between the rectifier 234 and the load 236. The rectifier 234 may be coupled to a voltage input terminal of the voltage controlled charge pump. The DC voltage from the rectifier 234 acts as an input voltage (Vin) for the voltage controlled charge pump. Further, the load 236 may be coupled to a voltage output terminal of the voltage controlled charge pump and receive an output voltage (Vout). In certain aspects, the voltage controlled charge pump is configured to limit the voltage output by the receiver 208 to an appropriate voltage for the load 236.

Figure 4:
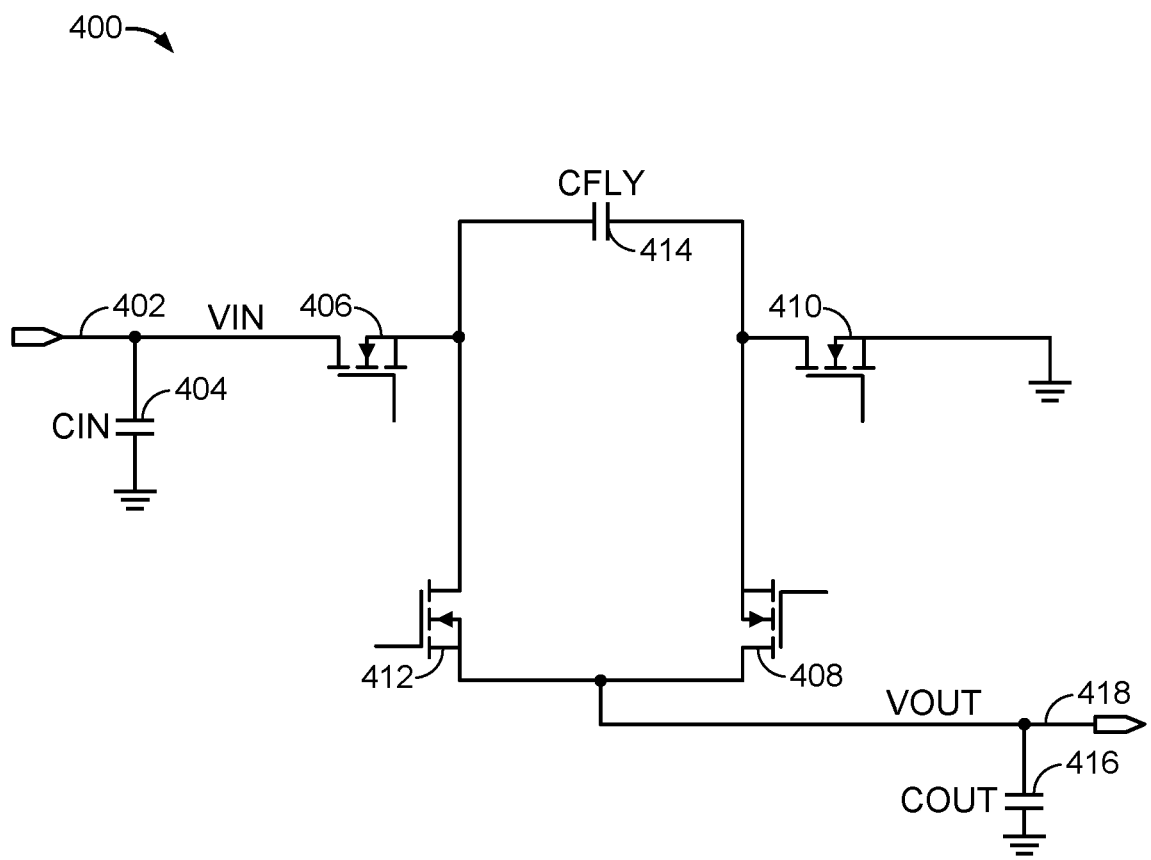
FIG. 4 illustrates a charge pump in accordance with certain aspects.

FIG. 4 illustrates a charge pump 400 in accordance with certain aspects. In some aspects, the charge pump 400 may comprise an open loop divide-by-two charge pump. In certain aspects, the charge pump may operate in a divide-by-two mode, where the output voltage Vout of the charge pump 400 is half of the input voltage Vin of the charge pump 400 (Vout=Vin/2). In certain aspects, the charge pump 400 may operate in a bypass mode where the output voltage Vout of the charge pump 400 is equal to the input voltage Vin.

As shown, the charge pump 400 includes a voltage input terminal 402. The voltage input terminal 402 may be coupled to a power source (e.g., receiver 208). The charge pump further includes an input capacitor (Cin) 404, coupled between the voltage input terminal 402, and a reference potential (e.g., ground).

The charge pump 400 further includes a first transistor 406, a second transistor 408, a third transistor 410, and a fourth transistor 412. In some aspects, gate terminals of each of the first transistor 406 and second transistor 408 may be coupled to a first control signal (e.g., from a controller, such as, a PMIC, processor, controller 250, etc.). Accordingly, the operation (i.e., opening and closing) of the first transistor 406 and second transistor 408 may be the same and controlled by the same first control signal (e.g., high or low) applied to the first transistor 406 and second transistor 408. Similarly, gate terminals of each of the third transistor 410 and the fourth transistor 412 may be coupled to a second control signal (e.g., from a controller, such as, a PMIC, processor, controller 250, etc.). Accordingly, the operation (i.e., opening and closing) of the third transistor 410 and the fourth transistor 412 may be the same and controlled by the same first control signal (e.g., high or low) applied to the third transistor 410 and the fourth transistor 412.

The first transistor 406 is coupled between the voltage input terminal 402 and a flying capacitor (Cfly) 414. The Cfly 414 is coupled between the first transistor 406 and the second transistor 408. The second transistor 408 is coupled between Cfly 414 and a voltage output terminal 418. The third transistor 410 is coupled between a reference potential (e.g., ground) and Cfly 414. The fourth transistor 412 is coupled between Cfly 414 and the voltage output terminal 418. An output capacitor (Cout) 416 is further coupled between the voltage output terminal 418 and a reference potential (e.g., ground).

The charge pump 400 operates in two modes while in a divide-by-two mode, a charging mode and a discharging mode. In some aspects, in the charging mode, the capacitors Cfly 414 and Cout 416 are coupled in series and charged by an input voltage Vin applied to the voltage input terminal 402. In particular, the first transistor 406 and the second transistor 408 are closed (based on the first control signal) in the charging mode and the third transistor 410 and fourth transistor 412 are open (based on the second control signal).

Further, in the discharging mode, the capacitors Cfly 414 and Cout 416 are coupled in parallel and discharge and supply a voltage to the voltage output terminal 418. In particular, the first transistor 406 and the second transistor 408 are open (based on the first control signal) in the discharging mode and the third transistor 410 and fourth transistor 412 are closed (based on the second control signal).

The charge pump 400 may be configured to change modes between the charging mode and discharging mode based on a clock signal (e.g., based on an oscillator). For example, a clock signal may oscillate between low and high signals according to a frequency (e.g., fixed frequency) and duty cycle, and a controller that generates control signals for the first transistor 406, the second transistor 408, the third transistor 410, and the fourth transistor 412 may generate the control signals based on the clock signal. The charge pump 400 may be in a charging mode when the clock is at a first value (e.g., high or low) and may be in a discharging mode when the clock is at a second value (e.g., the other of high or low). In some aspects, where the charge pump 400 is an open loop divide-by-two charge pump, the frequency and duty cycle may be set (e.g., to 50%) to ensure that the voltage Vout at the output terminal is equal to Vin/2.

As discussed, in some aspects, the charge pump 400 can act in a divide-by-two mode or a bypass mode. In the bypass mode, the input terminal 402 may be directly coupled to the output terminal 418, meaning Vin=Vout, and a load is directly coupled to the input voltage Vin (e.g., first transistor 406 and fourth transistor 412 are closed, and second transistor 408 and third transistor 410 are open). The bypass mode is distinct from the charging mode and the discharging mode used while in the divide-by-two mode. In particular, in the bypass mode, unlike the charging mode and discharging mode, Cfly 414 and Cout 416 are not charged and discharged. Further, in the divide by two mode, Vout=Vin/2. Accordingly, if a device has a voltage requirement Vreq (e.g., 4-10V), the input voltage Vin can be anywhere from 4V-20V, and the charge pump 400 can generate the voltage Vreq. Therefore, the input voltage Vin (e.g., induced voltage at the receiver 208) does not have to be constrained to Vreq, but has a wider range of constraint. However, even with the charge pump 400, the input voltage still has a constraint range based on the voltage range accepted by the load. In particular, the output voltage Vout of the charge pump 400 is still highly dependent on Vin. Further, in some aspects, though a load may accept a wide voltage range for operation, there may be efficiency gains when operating at certain voltages within that range (e.g., certain lower voltages of the range). The charge pump 400 may not be configured to control/limit the output voltage Vout to such voltages where operation is more efficient since Vin may vary. The charge pump 400 may therefore need to operate with another controller (e.g., PMIC) to ensure the voltage to a load is within operating constraints, which may increase complexity and cost. Accordingly, certain aspects herein provide a voltage controlled charge pump that can limit the output voltage Vout to a value independently of Vin.

Figure 5:
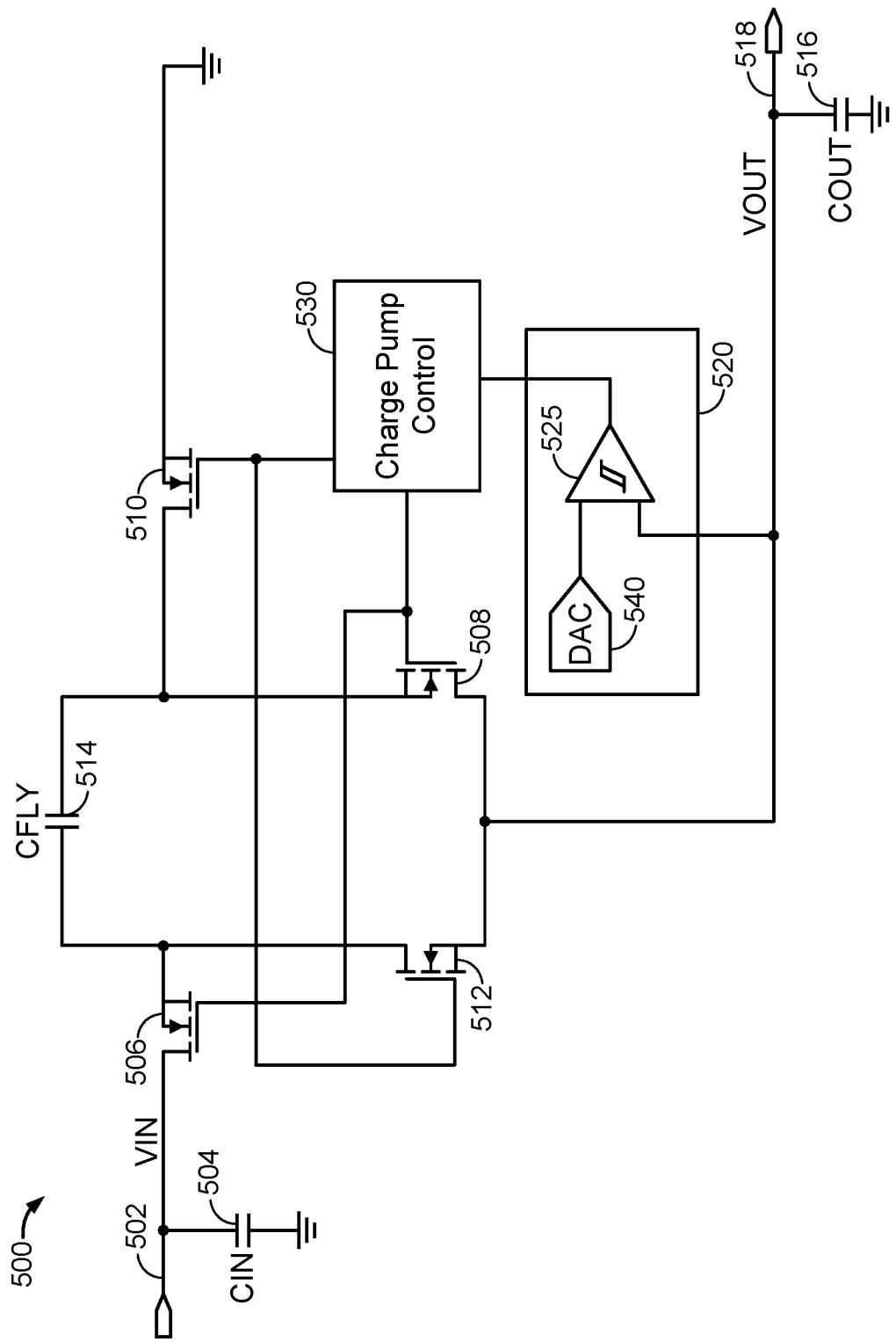
FIG. 5 illustrates a voltage controlled charge pump in accordance with certain aspects.

FIG. 5 illustrates a voltage controlled charge pump 500 in accordance with certain aspects. In particular, the charge pump 500 is similar to the charge pump 400. However, the charge pump 500, in addition to the elements included in charge pump 400, includes a feedback path 520 coupled to a controller 530.

In certain aspects, the charge pump may operate in an active mode, where the output voltage Vout of the charge pump 500 is based on the selective opening and closing of switches, such as, the first transistor 506, the second transistor 508, the third transistor 510, and the fourth transistor 512 by the controller 530 as discussed herein. The active mode may be similar to a divide-by-two mode as described herein, where the charge pump 500 is configured to operate in two modes, the charging mode and the discharging mode, however the frequency and duty cycle of the switches may be different (e.g., different than 50%) to achieve other voltages at the output terminal. In certain aspects, the charge pump 500 may operate in a bypass mode where the output terminal 518 of the charge pump 500 is coupled to the input terminal 502 and the output voltage Vout of the charge pump 500 is equal to the input voltage Vin.

As shown, the controller 530 is coupled to the gate terminals of the first transistor 506, the second transistor 508, the third transistor 510, and the fourth transistor 512, and generates control signals to selectively open and close the first transistor 506, the second transistor 508, the third transistor 510, and the fourth transistor 512. Similar to charge pump 400, in some aspects, each of the first transistor 506 and the second transistor 508 are coupled to the same control signal and/or can be controlled together, and each of the third transistor 510 and the fourth transistor 512 are coupled to the same control signal and/or can be controlled together.

In some aspects, in the active mode, the controller 530 may generate the control signals, at least in part, based on a clock signal (e.g., based on an oscillator). For example, the clock signal may oscillate between low and high signals according to a frequency and duty cycle, and the controller 530 may generate the control signals based on the clock signal. In some aspects, the frequency of the clock signal is fixed. In some aspects, the frequency of the clock signal can be based on a dynamic-load adaptive switching frequency technique, where the frequency is dependent on a load coupled to the output terminal 518. In some aspects, a load-adaptive switching frequency can improve efficiency and accommodate higher ratios of Vin/Vout. For example, the charge pump 500 may include a timer circuit coupled to one or more of Cfly 514 and Cout 516 configured to determine how long the capacitors take to charge to a target voltage level. Based on the duration calculated by the timer circuit, which may be input to the controller 530, the controller 530 may change the frequency and/or duty cycle of the clock signal so that the duration of the charging mode based on the frequency and/or duty cycle approximately charges the Cfly 514 and/or Cout 516 to the target voltage level to better control Vout (e.g., the duration of the charging mode is the duration calculated by the timer circuit). In some aspects, the target voltage for Cfly 514 and/or Cout 516 may be two times the desired Vout.

In some aspects, in the active mode, when the clock is at a first value (e.g., high or low), the controller 530 may operate the charge pump 500 in a charging mode, and when the clock is at a second value (e.g., the other of high or low) the controller 530 may operate the charge pump 500 in a discharging mode. Similar to charge pump 400, in the charging mode first transistor 506 and the second transistor 508 are closed (based on a first control signal) and the third transistor 510 and fourth transistor 512 are open (based on a second control signal). Further, in the discharging mode first transistor 506 and the second transistor 508 are open (based on the first control signal) and the third transistor 510 and fourth transistor 512 are closed (based on the second control signal).

In certain aspects, in addition to selectively opening and closing the first transistor 506, the second transistor 508, the third transistor 510, and the fourth transistor 512 based on the clock signal, the controller 530 is configured to selectively open and close the plurality of switches based on a voltage on the feedback path 520 (e.g., based on a signal received from the feedback path 520). The feedback path 520, as shown, includes a comparator 525. The feedback path 520 is coupled to the output terminal 518 (and accordingly also Cout 516). Therefore, the voltage on the feedback path 520 is equal to the voltage Vout, which is also equal to the voltage at Cout 516. However, as one of ordinary skill in the art will recognize, the feedback path 520 could instead be coupled, for example, to Cfly 514. Accordingly, the voltage on the feedback path would equal the voltage (Vfly) at Cfly 514. In some embodiments, where the capacitance of Cfly=the capacitance of Cout, then Vfly=Vout. It should be noted that in certain aspects the feedback path 520 may be implemented as an analog loop or a digital loop.

The voltage on the feedback path 520 is input into a first terminal of the comparator 525. For example, the first terminal of the comparator 525 may be coupled to the output terminal 518 or Cfly 514. Further, a reference voltage is input into a second terminal of the comparator 525. For example, the second terminal of the comparator 525 may be coupled to a reference voltage (e.g., generated by a digital-to-analog converter (DAC) 540). In some aspects, the reference voltage may be a target or upper limit voltage for a load coupled to the output terminal 518. The reference voltage may be fixed, or may be configurable (e.g., via a programmable register). The comparator 525, accordingly, may output a signal to the controller 530 as to whether the voltage on the feedback path is below the reference voltage or not. It should be noted that though a signal from a comparator 525 is discussed for use by the controller 530, in some aspects other signals indicative of the voltage on the feedback path 520 may be used by the controller 530 to control the opening and closing of the first transistor 506, the second transistor 508, the third transistor 510, and the fourth transistor 512.

In some aspects, the controller 530, based on the signal from the comparator 525, may modify the operation of the charge pump 500. In some aspects, the controller 530 may modify a duration of the charging mode of the charge pump 500. As discussed, a clock signal may indicate to the controller 530 to operate the charge pump 500 in a charging mode. In certain aspects, the controller 530 may further determine whether to operate the charge pump 500 in the charging mode based on the signal from the comparator 525. For example, if the signal from the comparator 525 indicates the voltage on the feedback path is below the reference voltage, and the clock signal indicates to operate the charge pump 500 in the charging mode, then the controller 530 operates the charge pump 500 in the charging mode. However, if the clock signal indicates to operate the charge pump 500 in the charging mode, but the signal from the comparator 525 indicates the voltage on the feedback path is at or above the reference voltage then the controller 530 operates the charge pump 500 in a hold mode. In the hold mode, each of the first transistor 506, the second transistor 508, the third transistor 510, and the fourth transistor 512 are open and the Cfly 514 and Cout 516 are neither charged nor discharged. Accordingly, the duration of the charging mode for a clock cycle may be reduced based on the voltage on the feedback path 520. In particular, the controller 530, based on the feedback, may prevent the voltage of Cfly 514 and Cout 516 from going above the reference voltage (e.g., the target or upper limit voltage for a load). Accordingly, the reference voltage acts as an upper threshold for the voltage on the feedback path, where if the voltage on the feedback path is above the threshold, the duration of the charging mode is modified. Therefore, when the charge pump 500 is in a discharging mode (e.g., based on the clock signal) and the load is coupled to Cfly 514 and Cout 516, the voltage at the output terminal 518 is limited to the reference voltage. Thus, unlike the charge pump 400, the charge pump 500 can limit the voltage at the output terminal 518 independent of the input voltage at the input terminal 502. Therefore, the charge pump 500 may be directly coupled to a load while still providing output voltage limiting, and not need an additional controller (e.g., PMIC) coupled between the load and the charge pump 500 to ensure the voltage to the load is within operating constraints.

In some other aspects, instead of or in addition to changing the duration of the charging mode by enabling a hold mode as discussed based on the signal from the comparator 525, the controller 530 may be configured to change a duty cycle of the clock signal based on the signal from the comparator 525. For example, if the signal from the comparator 525 indicates that the voltage on the feedback path 520 is above the reference voltage, the controller 530 may change the duty cycle to decrease the duration of the charging mode as compared to the discharging mode during a clock cycle. If the signal from the comparator 525 indicates that the voltage on the feedback path 520 is below the reference voltage, the controller 530 may set the duty cycle at a base line duty cycle or increase the duration of the charging mode as compared to the discharging mode during a clock cycle. Accordingly, when the voltage on the feedback path 520 is above the reference voltage, the duty cycle is modified so that the charging mode time is reduced for a clock cycle, and therefore the voltage level to which Cfly 514 and Cout 516 are charged may be decreased. Accordingly, the voltage at the output terminal 518 is limited based on the reference voltage.

As discussed herein, in some aspects, the reference voltage input to the comparator 525 may be a target or upper limit voltage for a load coupled to the output terminal 518. In particular, as discussed, the target or upper limit voltage is used by the controller 530 to modify a duration of a charging mode (e.g., by entering a holding mode and/or modifying a duty cycle of a clock signal). In some aspects, additionally or alternatively, the controller 530 may modify a duration of the discharging mode of the charge pump 500 based on whether the voltage on the feedback path 520 is below a reference voltage or not. For example, the feedback path 520 may include a second comparator (not shown) with a first terminal coupled to the output terminal 518 or Cfly 514, and a second terminal coupled to a second reference voltage. The second reference voltage may be set to a lower limit voltage for a load coupled to the output terminal 518. A signal from the second comparator may indicate if the voltage on the feedback path 520 is above the second reference voltage or below the second reference voltage. The controller 530 may modify the duration of the discharging mode of the charge pump 500 based on the signal from the second comparator. For example, when the clock signal indicates to the controller 530 that the charge pump 500 is in the discharging mode, and the signal from the second comparator indicates that the voltage on the feedback path 520 is above the second reference voltage, the controller 530 operates the charge pump 500 in the discharging mode. However, when the clock signal indicates to the controller 530 that the charge pump 500 is in the discharging mode, but the signal from the second comparator indicates that the voltage on the feedback path 520 is below the second reference voltage, the controller 530 may operate the charge pump 500 in the charging mode. For example, the controller 530 may asynchronously operate the charge pump 500 in the charging mode for one or more clock cycles. Accordingly, the duration of the discharging mode for one or more clock cycles may be reduced based on the voltage on the feedback path 520. Further, the duration of the charging mode may be increased for one or more cycles based on the voltage on the feedback path 520. In particular, the charge pump 500 operates to charge Cfly 514 and Cout 516 above the lower voltage limit. Therefore, the charge pump 500 can limit how low of a voltage is applied to the output terminal 518. The voltage on the feedback path 520, accordingly, acts as a lower threshold of modifying the duration of the discharging mode and the charging mode.

In some aspects, instead of the charge pump 500 including a second comparator, the reference voltage input to the comparator 525 may be changed based on the clock signal. For example, if the clock signal indicates that the charge pump 500 is in a charging mode, then the reference voltage may be set to the target or upper limit voltage as discussed. If the clock signal indicates that the charge pump 500 is in a discharging mode, then the reference voltage may be set to a lower limit voltage for a load coupled to the output terminal 518. Accordingly, the signal from the comparator 525 may be used by the controller 530 to modify the duration of the discharging cycle.

In some aspects, instead of or in addition to changing the duration of the discharging mode by asynchronously entering a charging mode as discussed based on the signal from the second comparator or comparator 525, the controller 530 may be configured to change a duty cycle of the clock signal based on the signal from the second comparator or comparator 525. For example, if the signal from the second comparator or comparator 525 indicates that the voltage on the feedback path 520 is below the lower limit voltage, the controller 530 may change the duty cycle to increase the duration of the charging mode as compared to the discharging mode during a clock cycle. If the signal from the second comparator or comparator 525 indicates that the voltage on the feedback path 520 is above the lower limit voltage, the controller 530 may set the duty cycle at a base line duty cycle or decrease the duration of the charging mode as compared to the discharging mode during a clock cycle. Accordingly, when the voltage on the feedback path 520 is below the lower limit voltage, the duty cycle is modified so that the discharging mode time is reduced for one or more clock cycles, and therefore the voltage level to which Cfly 514 and Cout 516 are charged may be increased. Accordingly, the voltage at the output terminal 518 is limited based on the lower limit voltage.

In some aspects, the controller 530 may utilize pulse width modulation (PWM) to control the first transistor 506, the second transistor 508, the third transistor 510, and the fourth transistor 512 to regulate the output voltage of the charge pump 500 based on any of the aspects described herein.

Figure 6:
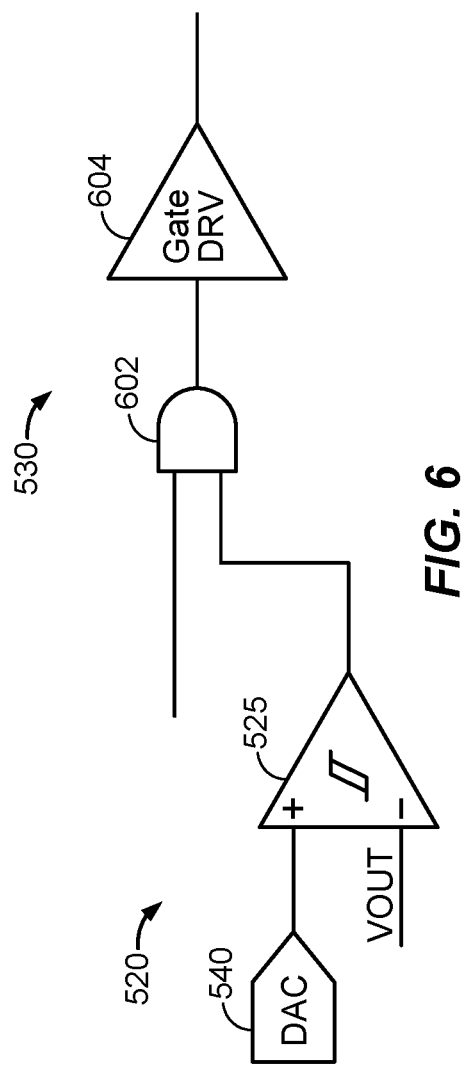
FIG. 6 illustrates a circuit diagram for an example implementation of the feedback path and controller of the charge pump of FIG. 5, in accordance with certain aspects.

FIG. 6 illustrates a circuit diagram for an example implementation of the feedback path 520 and controller 530 of charge pump 500 of FIG. 5, in accordance with certain aspects. In some aspects, the implementation in FIG. 6 comprises a digital implementation.

As shown, the feedback path 520 comprises the comparator 525 coupled to the DAC 540 and one of the output terminal 518, Cfly 514, and Cout 516, as discussed. The controller 530 further comprises an AND gate 602 and a gate driver 604. A first input terminal of the AND gate 602 is coupled to the output terminal of the comparator 525. A second input terminal of the AND gate 602 is coupled to a path carrying a signal based on the clock signal for controlling the operation of the charge pump 500. The output terminal of the AND gate 602 is coupled to the input of the gate driver 604. The output of the gate driver 604 is coupled to gate terminals of one of the sets of transistors (e.g., first transistor 506 and second transistor 508, or third transistor 510 and fourth transistor 512). Accordingly, the control signal to the transistors is based both on the clock signal and the signal from the comparator 525.

For example, in certain aspects, the AND gate 602 may output a signal to close the first transistor 506 and the second transistor 508 only when both the clock signal indicates a charging mode and the comparator indicates the voltage along the feedback path 520 is less than an upper limit voltage as set by the DAC 540. In certain aspects, the AND gate 602 may output a signal to close the third transistor 510 and the fourth transistor 512 only when both the clock signal indicates a discharging mode and the comparator indicates the voltage along the feedback path 520 is greater than a lower limit voltage as set by the DAC 540. In certain aspects, the AND gate 602 may output a signal to close the first transistor 506 and the second transistor 508 only when both the clock signal indicates a discharging mode and the comparator indicates the voltage along the feedback path 520 is less than a lower limit voltage as set by the DAC 540.

Figure 7:
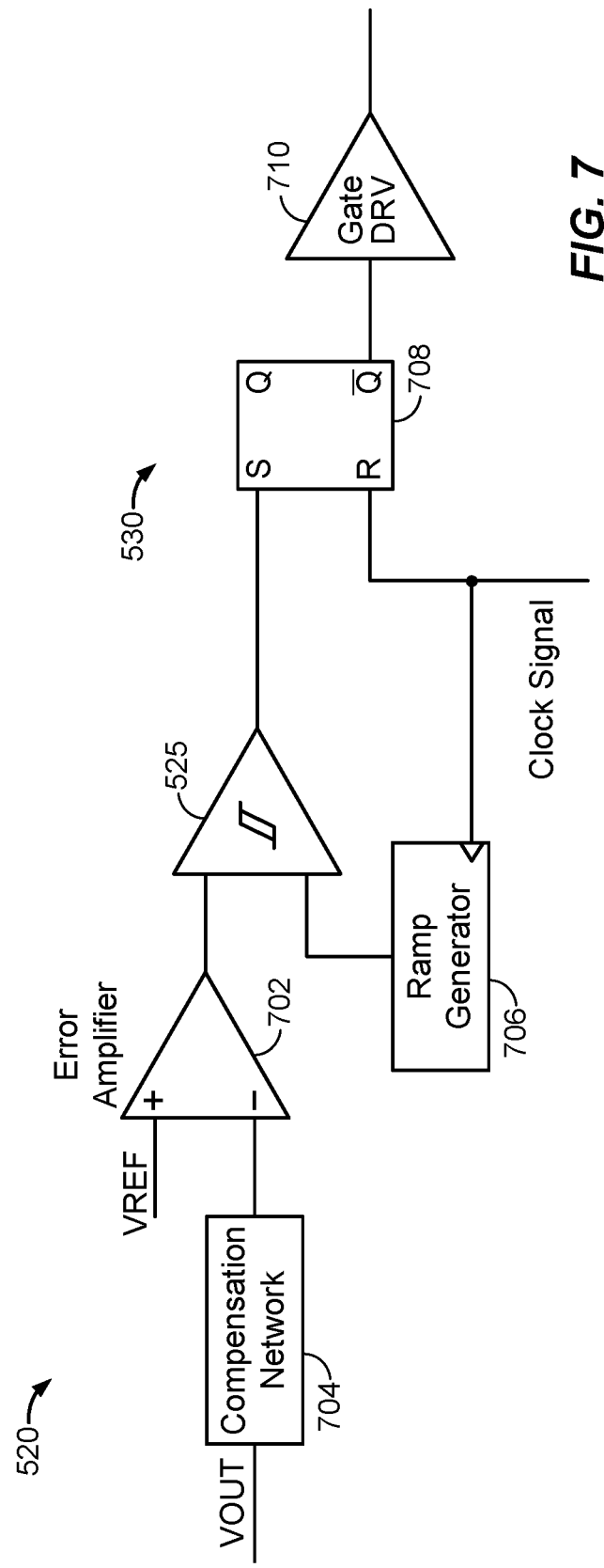
FIG. 7 illustrates a circuit diagram for an example implementation of the feedback path and controller of the charge pump of FIG. 5, in accordance with certain aspects.

FIG. 7 illustrates a circuit diagram for an example implementation of the feedback path 520 and controller 530 of the charge pump of FIG. 5, in accordance with certain aspects. In some aspects, the implementation in FIG. 7 comprises an analog implementation.

The feedback path 520 includes the comparator 525. A first input terminal of the comparator 525 is coupled to an output terminal of an error amplifier 702. A reference voltage Vref is applied to a first input terminal of the error amplifier 702. Further, a second input terminal of the error amplifier 702 is coupled to a compensation network 704, which is further coupled to the output terminal 518, Cfly 514, or Cout 516. A second terminal of the comparator 525 is coupled to the output of a ramp generator 706, the input of which is coupled to a path carrying the clock signal. The output of the comparator 525 is coupled to a S-R latch 708, in particular, the output of the comparator 525 is coupled to the S (e.g., set) terminal of the S-R latch 708. The R (e.g., reset) terminal of the S-R latch 708 is coupled to a path carrying the clock signal. The $\overline{Q}$ terminal is coupled to the input of a gate driver 710. The output of the gate driver 710 is coupled to gate terminals of one of the sets of transistors (e.g., first transistor 506 and second transistor 508, or third transistor 510 and fourth transistor 512). Accordingly, the control signal to the transistors is based both on the clock signal and the signal from the comparator 525.

Figure 8:
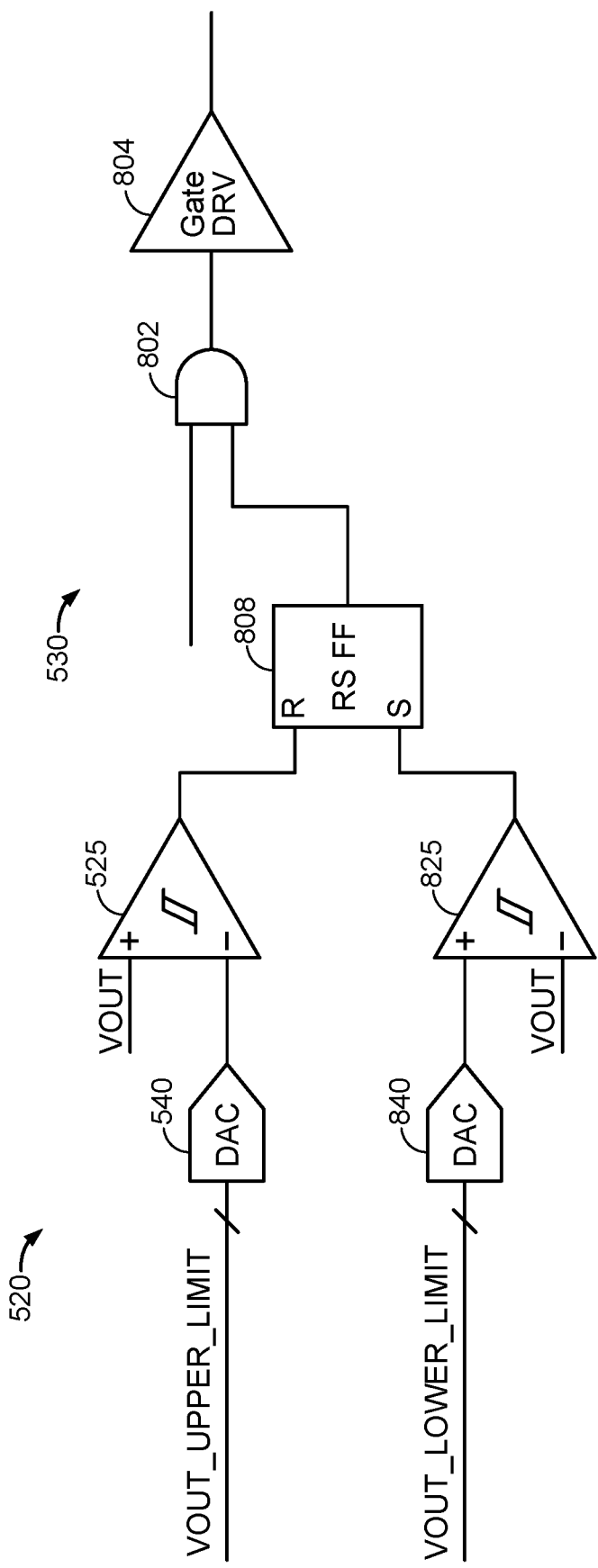
FIG. 8 illustrates a circuit diagram for an example implementation of the feedback path and controller of the charge pump of FIG. 5, in accordance with certain aspects.

FIG. 8 illustrates a circuit diagram for an example implementation of the feedback path and controller of the charge pump of FIG. 5, in accordance with certain aspects. In some aspects, the implementation in FIG. 8 comprises a digital implementation.

As shown, the feedback path 520 comprises the comparator 525 coupled to the DAC 540 and one of the output terminal 518, Cfly 514, and Cout 516, as discussed. The feedback path 520 further comprises a second comparator 825 coupled to a second DAC 840 and one of the output terminal 518, Cfly 514, and Cout 516, as discussed.

The controller 530 further comprises a RS flip-flop (e.g., S-R latch) 808, an AND gate 802, and a gate driver 804. The R terminal of the RS flip-flop 808 is coupled to the output of the comparator 525, and the S terminal of the RS flip-flop 808 is coupled to the output of the second comparator 825. An output of the RS flip-flop 808 (e.g., $\overline{Q}$ terminal or Q terminal) is coupled to a first input terminal of the AND gate 802. A second input terminal of the AND gate 802 is coupled to a path carrying a signal based on the clock signal for controlling the operation of the charge pump 500. The output terminal of the AND gate 802 is coupled to the input of the gate driver 804. The output of the gate driver 804 is coupled to gate terminals of one of the sets of transistors (e.g., first transistor 506 and second transistor 508, or third transistor 510 and fourth transistor 512). Accordingly, the control signal to the transistors is based on the clock signal, the signal from the comparator 525, and the signal from the second comparator 825.

For example, the state of the RS flip-flop 808 may indicate a state of the voltage on the feedback path 520. Initially, the RS flip-flop 808 may be set to a state indicating that the charge pump 500 should operate in a charging mode. Accordingly, in certain aspects, the AND gate 802 may output a signal to close the first transistor 506 and the second transistor 508 when both the clock signal indicates a charging mode and the RS flip-flop indicates a charging mode. Further, when the voltage on the feedback path 520 becomes greater than the upper limit voltage as set by the DAC 540, the state of the RS flip-flop 808 is reset and indicates that the charge pump 500 should not operate in a charging mode. Accordingly, in certain aspects, the AND gate 802 may output a signal to open the first transistor 506 and the second transistor 508 when the clock signal indicates a charging mode, but the RS flip-flop indicates not to operate in a charging mode. In some aspects, the charge pump 500 may operate in a hold mode when the clock signal indicates a charging mode, but the RS flip-flop indicates not to operate in a charging mode. Further, when the voltage on the feedback path 520 then becomes less than a lower limit voltage as set by the DAC 840, the state of the RS flip-flop 808 is set and indicates that the charge pump 500 should operate in a charging mode again. Accordingly, in certain aspects, the AND gate 802 may output a signal to close the first transistor 506 and the second transistor 508 when both the clock signal indicates a charging mode and the RS flip-flop indicates a charging mode. The RS flip-flop 808 therefore provides a type of hysteresis for the charging mode of the charge pump 500 based on the voltage on the feedback path 520.

Figure 9:
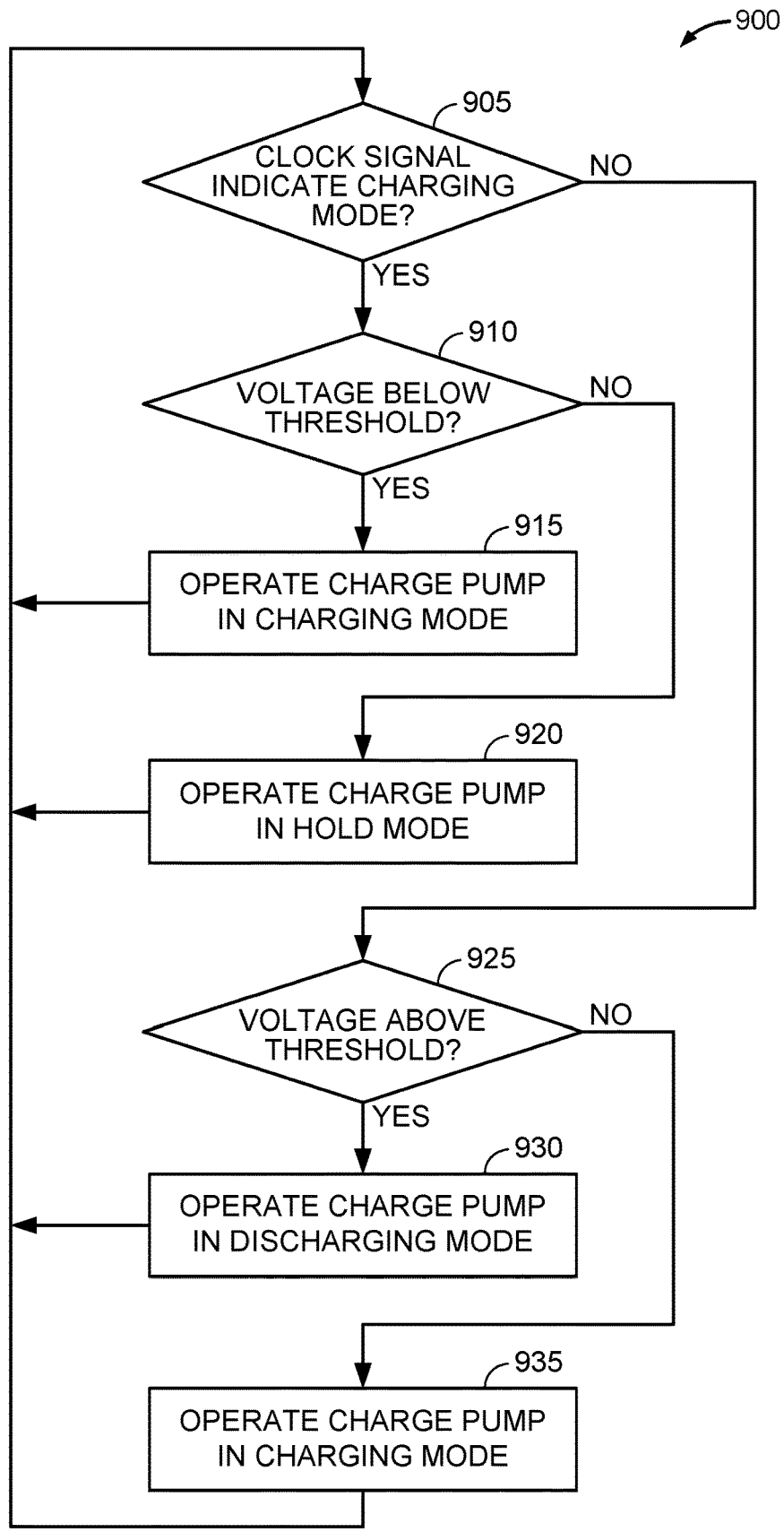
FIG. 9 is a flowchart of example operations for operating a voltage controlled charge pump, in accordance with certain aspects of the present disclosure.

FIG. 9 is a flowchart of example operations 900 for operating a voltage controlled charge pump, in accordance with certain aspects of the present disclosure.

At step 905, it is determined if a clock signal indicates a charge pump should operate in a charging mode. For example, the charge pump may include a plurality of switches, and at least one capacitor. In the charging mode, the charge pump may be configured to selectively open and close the switches to couple an input voltage from a voltage source to the at least one capacitor to charge the capacitor.

If at 905, it is determined the clock signal indicates the charge pump should operate in the charging mode, the operations 900 continue to 910. At 910, it is determined if a voltage at an output terminal of the charge pump or at the at least one capacitor is below a threshold voltage. If at 910, it is determined the voltage at the output terminal of the charge pump or at the at least one capacitor is below the threshold voltage, the operations 900 continue to 915. At 915, the charge pump is operated in the charging mode.

If at 910, it is determined the voltage at the output terminal of the charge pump or at the at least one capacitor is at or above the threshold voltage, the operations 900 continue to 920. At 920, the charge pump is operated in a hold mode. In the hold mode, the charge pump may be configured to open all the switches and decouple the at least one capacitor from the load and the input voltage.

If at 905, it is determined the clock signal indicates the charge pump should operate in the discharging mode, the operations 900 continue to 925. In the discharging mode, the charge pump may be configured to selectively open and close the switches to couple the at least one capacitor to a load so the at least one capacitor can supply a voltage to the load. At 925, it is determined if a voltage at an output terminal of the charge pump or at the at least one capacitor is above a threshold voltage. If at 925, it is determined the voltage at the output terminal of the charge pump or at the at least one capacitor is above the threshold voltage, the operations 900 continue to 930. At 930, the charge pump is operated in the discharging mode.

If at 925, it is determined the voltage at the output terminal of the charge pump or at the at least one capacitor is at or below the threshold voltage, the operations 900 continue to 935. At 935, the charge pump is operated in the charging mode.

Figure 10:
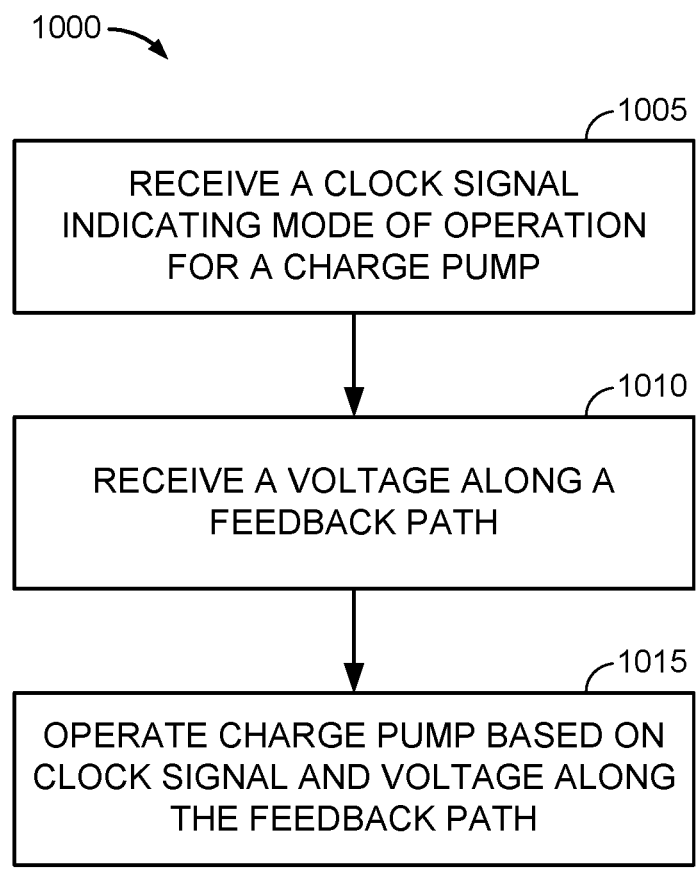
FIG. 10 is a flowchart of example operations for operating a voltage controlled charge pump, in accordance with certain aspects of the present disclosure.

FIG. 10 is a flowchart of example operations 1000 for operating a voltage controlled charge pump, in accordance with certain aspects of the present disclosure.

At step 1005, a controller receives a clock signal indicating a mode of operation for a charge pump. At step 1010, the controller receives a voltage along a feedback path, the voltage being a voltage at an output terminal of the charge pump or at a capacitor of the charge pump. At step 1015, the controller generates a control signal to operate the charge pump based on the clock signal and the voltage along the feedback path. In certain aspects, the charge pump may include a plurality of switches, and at least one capacitor. In certain aspects, the charge pump may operate in a charging mode, a discharging mode, or a hold mode. In the charging mode, the charge pump may be configured to selectively open and close the switches to couple an input voltage from a voltage source to the at least one capacitor to charge the capacitor. In the discharging mode, the charge pump may be configured to selectively open and close the switches to couple the at least one capacitor to a load so the at least one capacitor can supply a voltage to the load. In the hold mode, the charge pump may be configured to open all the switches and decouple the at least one capacitor from the load and the input voltage.

The methods of FIG. 9 and FIG. 10 may be used to operate/control voltage controlled charge pump 500, or any other suitable charge pumps.

Figure 11:
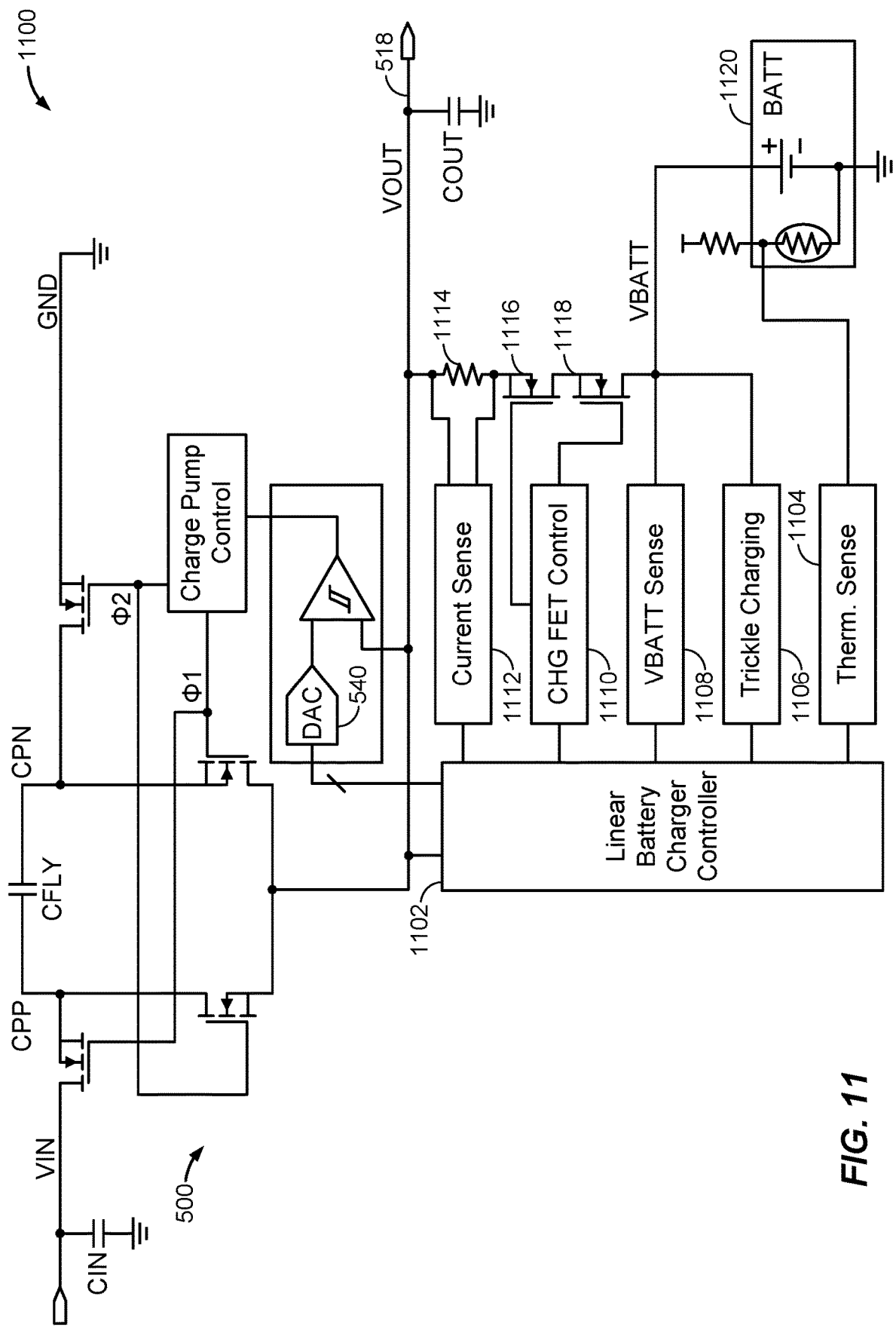
FIG. 11 illustrates a voltage controlled battery charger in accordance with certain aspects.

FIG. 11 illustrates a voltage controlled battery charger 1100 in accordance with certain aspects. In certain aspects, the voltage controlled battery charger 1100 may provide efficiency gains over other battery chargers. For example, other battery chargers may lose efficiency when operating over a wide range of voltages to charge a battery due to power dissipation and dropout. However, in certain aspects, the voltage selectively applied to the battery 1120 from the battery charger 1100 is limited (e.g., based on operation of the voltage controlled charge pump 500), thereby reducing power dissipation and dropout. For example, the voltage level of the battery 1120 of the battery charger 1100 may be used to control the voltage level of the voltage selectively applied to the battery 1120 from the battery charger 1100. Accordingly, the battery charger 1100 may operate over a wide range of voltages input to the battery charger 1100.

In certain aspects, as shown, the battery charger 1100 includes the voltage controlled charge pump 500 as a power supply to the battery charger 1100. In certain aspects, like the voltage controlled charge pump 500, the battery charger 1100 can be used in both wired and wireless power transfer implementations.

The battery charger 1100 includes a linear battery charger controller 1102, a thermal sensor 1104, a trickle charging unit 1106, a battery voltage Vbatt sensor 1108, a charging switch controller 1110, a current sensor 1112, a resistor 1114, a first switch 1116 (e.g., field-effect transistor (FET)), and a second switch 1118 (e.g., FET). The battery charger 1100 as shown is coupled to a battery 1120. The output terminal 518 of the charge pump 500 is coupled to the resistor 1114. The resistor 1114 is coupled to the first switch 1116, which is coupled to the second switch 1118. The second switch 1118 is further coupled to a terminal of the battery 1120. Accordingly, the signal with voltage Vout at the output terminal 518 is selectively applied to the battery 1120 based on the control of the first switch 1116 and the second switch 1118.

In some aspects, the charger controller 1102 is configured to limit the voltage applied to the battery 1120. For example, the charger controller 1102 may be coupled to the DAC 540 and configured to set the reference voltage for the DAC 540. Accordingly, in some aspects, the charger controller 1102 is configured to control/limit the Vout of the charge pump 500 as discussed herein, thereby limiting the voltage applied to the battery 1120. For example, in some aspects, the charger controller 1102 may be configured to limit the voltage applied to the battery 1120 to different voltage levels for different modes of charging of the battery 1120. For example, the battery charger 1100 may be configured to operate in a trickle charge mode, a pre-charge mode, a battery voltage charge mode, and a constant voltage charge mode.

Figure 12:
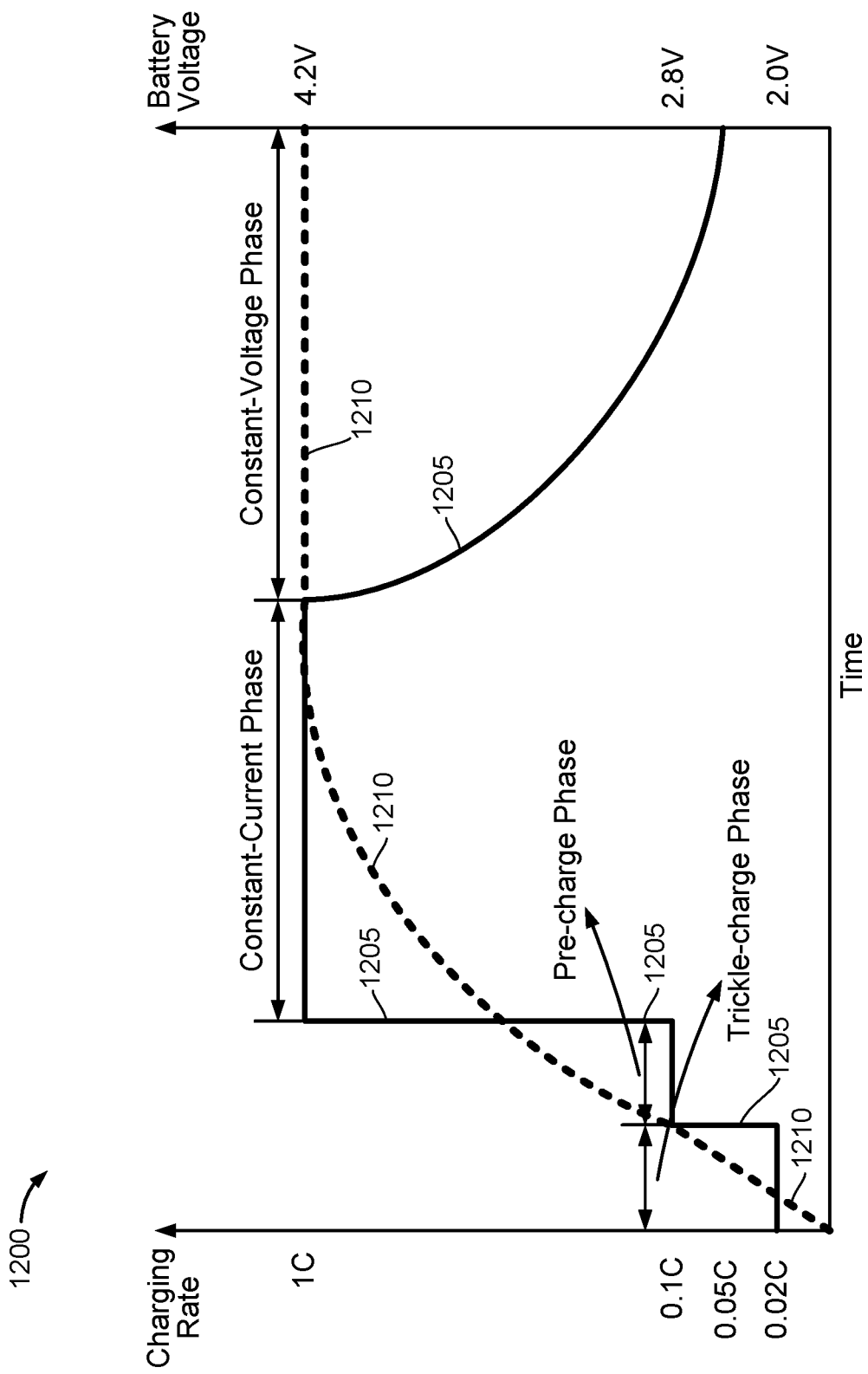
FIG. 12 is a graph illustrating an example of a three-phase charging process performed by the voltage controlled battery charger of FIG. 11 in accordance with certain aspects.

In some aspects, the various charging modes may be used for different phases of a standard three-phase charging process for battery 1120 as illustrated in graph 1200 of FIG. 12. The line 1205 indicates a charging rate (C-rate) of the battery 1120, and the line 1210 indicates a voltage Vbatt of the battery 1120. The x-axis indicates time, and the y-axis indicates a charging rate/voltage of the battery 1120. The trickle charge mode and pre-charge mode may be used for a battery conditioning phase. The battery voltage charge mode may be used for a constant-current phase, where the current applied to the battery 1120 is kept constant. The constant voltage charge mode may be used for the constant-voltage phase, where the voltage applied to the battery 1120 is kept constant.

In some aspects, the battery charger 1100 may be configured to operate in the trickle charge mode when the voltage of the battery 1120 is below a first threshold (e.g., 2.0V). The charger controller 1102, when the battery charger 1100 is in the trickle charge mode, may be configured to limit the voltage applied to the battery 1120 to the first threshold voltage (e.g., 2.0V). Accordingly, in some aspects, the charger controller 1102 limits the Vout of the charge pump 500 to the first threshold voltage (e.g., 2.0V) plus a set voltage (e.g., 200 mV) (e.g., Vout=first threshold voltage+ set voltage). In some aspects, the voltage of the set voltage may be selected based on a maximum dropout that may occur in the battery charger 1100 to ensure stability of the charger controller 1102. The maximum dropout may be based on the battery type and a bandwidth (e.g., voltage bandwidth) of the charger controller 1102.

In some aspects, the battery charger 1100 is configured to operate in the pre-charge mode when the voltage of the battery 1120 is above the first threshold and below a second threshold (e.g., 2.8V). The charger controller 1102, when the battery charger 1100 is in the pre-charge mode, may be configured to limit the voltage applied to the battery 1120 to the second threshold voltage (e.g., 2.8V). Accordingly, in some aspects, the charger controller 1102 limits the Vout of the charge pump 500 to the second threshold voltage (e.g., 2.8V) plus the set voltage (e.g., 200 mV) (e.g., Vout=second threshold voltage+set voltage).

In some aspects, the battery charger 1100 is configured to operate in the battery voltage charge mode when the voltage of the battery 1120 is above the second threshold and below a third threshold (e.g., 4.2V). The charger controller 1102, when the battery charger 1100 is in the battery voltage charge mode, may be configured to limit the voltage applied to the battery 1120 to the voltage of the battery 1120 (e.g., Vbatt). Accordingly, in some aspects, the charger controller 1102 limits the Vout of the charge pump 500 to Vbatt plus the set voltage (e.g., 200 mV) (e.g., Vout=Vbatt+set voltage).

In some aspects, the battery charger 1100 is configured to operate in the constant voltage charge mode when the voltage of the battery 1120 is at or above the third threshold (e.g., 4.2V). The charger controller 1102, when the battery charger 1100 is in the constant voltage charge mode, may be configured to limit the voltage applied to the battery 1120 to the third threshold (e.g., 4.2V). Accordingly, in some aspects, the charger controller 1102 limits the Vout of the charge pump 500 to the third threshold voltage plus the set voltage (e.g., 200 mV) (e.g., Vout=third threshold voltage+ set voltage).

Further, the charger controller 1102 is further coupled to and configured to control the charging switch controller 1110, which is coupled to and configured to control the selective opening and closing of the first switch 1116 and the second switch 1118. In some aspects, the charger controller 1102 may signal the charging switch controller 1110 to selectively open and close the first switch 1116 and the second switch 1118 to adjust the amount of current and/or voltage applied to the battery 1120 to charge the battery. Accordingly, in addition or alternative to controlling the voltage applied to the battery 1120 by controlling Vout of the charge pump 500, the battery charger 1100 can control/ regulate the voltage applied to the battery 1120 by selectively opening and closing the first switch 1116 and the second switch 1118. In other words, the battery charger 1100 functions as a linear regulator. Further, the charger controller 1102 can additionally control the current applied to the battery 1120 by selectively opening and closing the first switch 1116 and the second switch 1118.

Since the battery charger 1100 is configured to control both the voltage and the current applied to the battery 1120, independent of the power supplied to the battery charger 1100, the battery charger 1100 can utilize high voltage/low current input signals to the battery charger 1100, while still providing low voltage/higher current signals to charge the battery 1120. For wired application, the high voltage/low current input signals can reduce power losses on the wires. For wireless application, the high voltage/low current input signals can be achieved more efficiently at a wireless power receiver and provide better performance on a front end (e.g., resonant circuit) of the wireless power receiver.

The charger controller 1102 is further coupled to the thermal sensor 1104, which is coupled to the battery 1120 and configured to determine a temperature of the battery 1120. In some aspects, the charger controller 1102 is configured to control the application of Vout to the battery 1120 based on the temperature of the battery 1120 indicated by thermal sensor 1104. For example, if the temperature is above a threshold, the charger controller 1102 may stop application of Vout to the battery 1120 until the temperature lowers.

The charger controller 1102 is further coupled to the trickle charging unit 1106, which is coupled to the battery 1120. The trickle charging unit 1106 may be configured to determine the voltage level Vbatt of the battery 1120 and generate a signal when Vbatt is below a threshold voltage (e.g., 2.0V). In some aspects, the charger controller 1102 is configured to control whether the battery charger 1100 is in a trickle charge mode based on the signal from the trickle charging unit 1106. For example, when the trickle charging unit 1106 generates a signal that Vbatt is below the threshold voltage, the charger controller 1102 operates the battery charger 1100 in a trickle charge mode.

The charger controller 1102 is further coupled to the current sensor 1112, which is coupled to the resistor 1114 and configured to determine a current at the output terminal 518. As discussed, in some aspects, the charger controller 1102 is configured to control the application of current to the battery 1120. The charger controller 1102 may determine the current being applied to the battery 1120 based on the current determined by the current sensor 1112. Accordingly, the charger controller may control the current (e.g., switches 1116 and 1118) based on the current indicated by the current sensor 1112.

It should be noted that in certain aspects, instead of the voltage controlled battery charger 1100 including the voltage controlled charge pump 500 to supply a voltage (Vout), the voltage controlled battery charger 1100 may include a different component to supply a voltage (e.g., power) to the voltage controlled battery charger 1100. In some such aspects, the voltage (Vout) supplied by the component may be fixed, or may be programmed or controlled by the linear battery charger controller 1102 similar to as discussed herein with respect to the control of the voltage controlled charge pump 500 by the battery charger 1100. For example, in some aspects, the component that may supply the voltage (Vout) to the voltage controlled battery charger 1100 is another charge pump (e.g., similar to charge pump 400.)

In some aspects, a component that may supply the voltage (Vout) to the voltage controlled battery charger 1100 is a DC-DC converter (e.g., buck converter). The DC-DC converter may be configured to output a voltage Vout that is equal to the Vbatt needed to charge the battery 1120 plus some headroom voltage to account for dropout or other factors (e.g., Vout=Vbatt+Vheadroom). In some aspects, the battery charger 1100 may control the voltage applied to the battery 1120 from the DC-DC converter by controlling the first switch 1116 and the second switch 1118 to adjust the voltage applied to the battery 1120. In some aspects, the DC-DC converter may receive an input voltage from a power supply (e.g., wall plug-in AC-DC power adapter). In some aspects, the input voltage may be set to two times the Vout of the DC-DC converter, and the DC-DC converter may operate in a divide-by-two mode to output Vout. In some aspects, the DC-DC converter itself may have voltage regulation features and Vout may be set or limited by the linear battery charger controller 1102.

In some aspects, the component that supplies the Vout to the voltage controlled battery charger 1100 is an AC-DC converter (e.g., wall plug-in AC-DC power adapter). In some aspects, the AC-DC converter itself may have voltage regulation features and Vout may be set or limited by the linear battery charger controller 1102.

In some aspects, the component that supplied Vout to the voltage controlled battery charger 1100 is a wireless power receiver (e.g., receiver 208). In some aspects, the wireless power receiver itself may have voltage regulation features and Vout may be set or limited by the linear battery charger controller 1102. For example, in some aspects, the wireless power receiver includes a variable capacitor to selectively tune the resonant frequency of the receiver 208 and therefore adjust the voltage induced at the receiver 208. The linear battery charger controller 1102 may be configured to adjust the capacitance of the variable capacitor to adjust Vout of the wireless power receiver. In some aspects, the linear battery charger controller 1102 may be configured to adjust the operation of a rectifier 234 (e.g., a passive rectifier or an active rectifier) such as by switching in and out components of a passive rectifier, changing operation of switches of an active rectifier, etc., to adjust Vout of the wireless power receiver.

Figure 13:
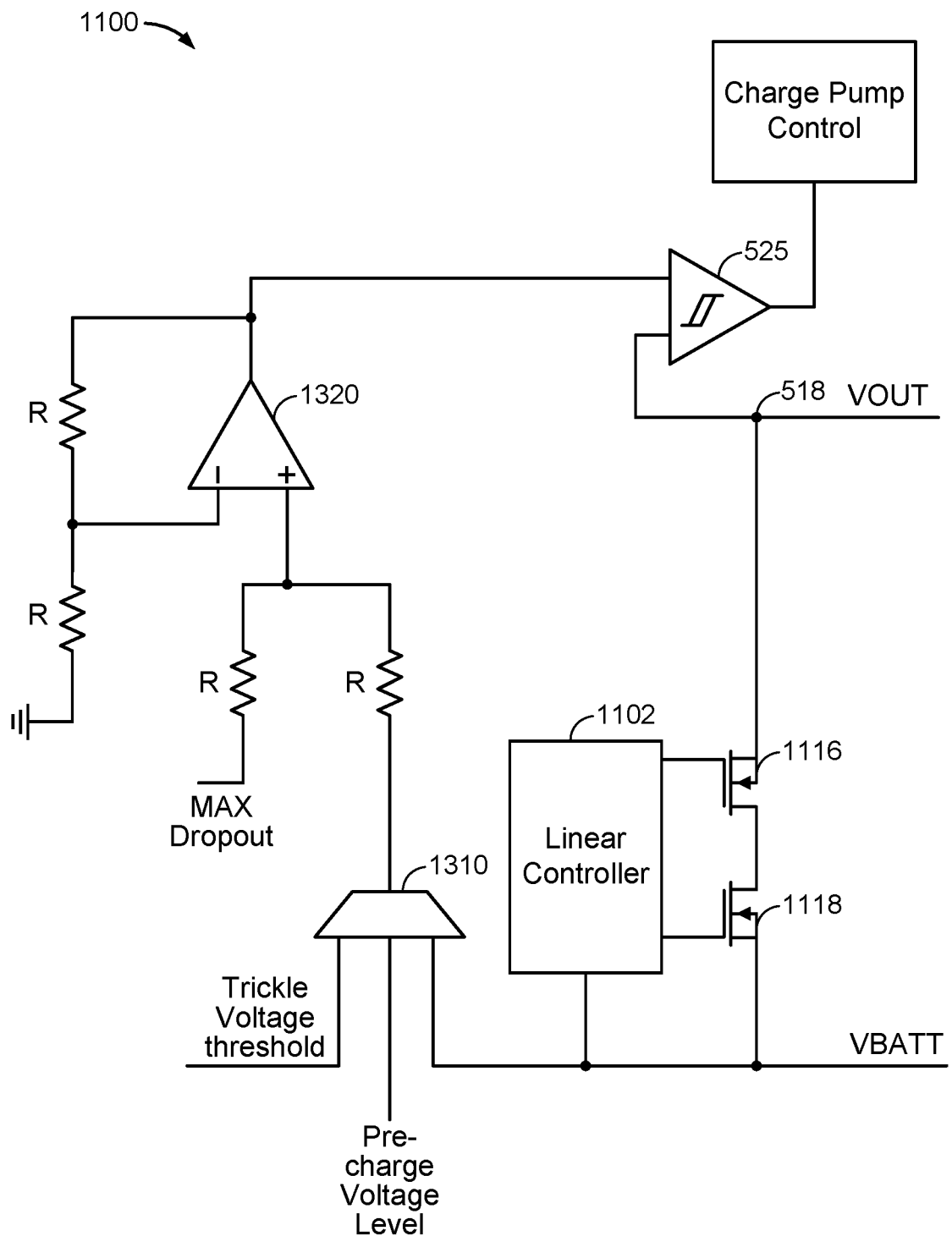
FIG. 13 illustrates a circuit diagram of a portion of an example of a voltage controlled battery charger of FIG. 11 in accordance with certain aspects.

FIG. 13 illustrates a circuit diagram of a portion of an example of a voltage controlled battery charger 1100 in accordance with certain aspects. As shown, the reference voltage for limiting Vout for the battery charger 1100 is set based on a mux 1310 and a summer circuit 1320. In particular, the mux 1310 receives as input the trickle voltage mode voltage threshold, the pre-charge voltage mode threshold, and the voltage of the battery 1120, Vbatt. The mux 1310 outputs one of the trickle voltage mode voltage threshold, the pre-charge voltage mode threshold, and Vbatt based on the voltage of Vbatt as discuss with respect to FIG. 11. For example, the mux 1310 may be controlled by the charger controller 1102. The output of the mux 1310 is coupled to the summer circuit 1320 along with the set voltage (e.g., maximum dropout voltage) as discussed with respect to FIG. 11. The output of the summer circuit 1320 is used as the reference voltage for the comparator 525 to limit Vout as discussed herein. Accordingly, the mux 1310 and a summer circuit 1320 are configured to limit Vout based on Vbatt.

Figure 14:
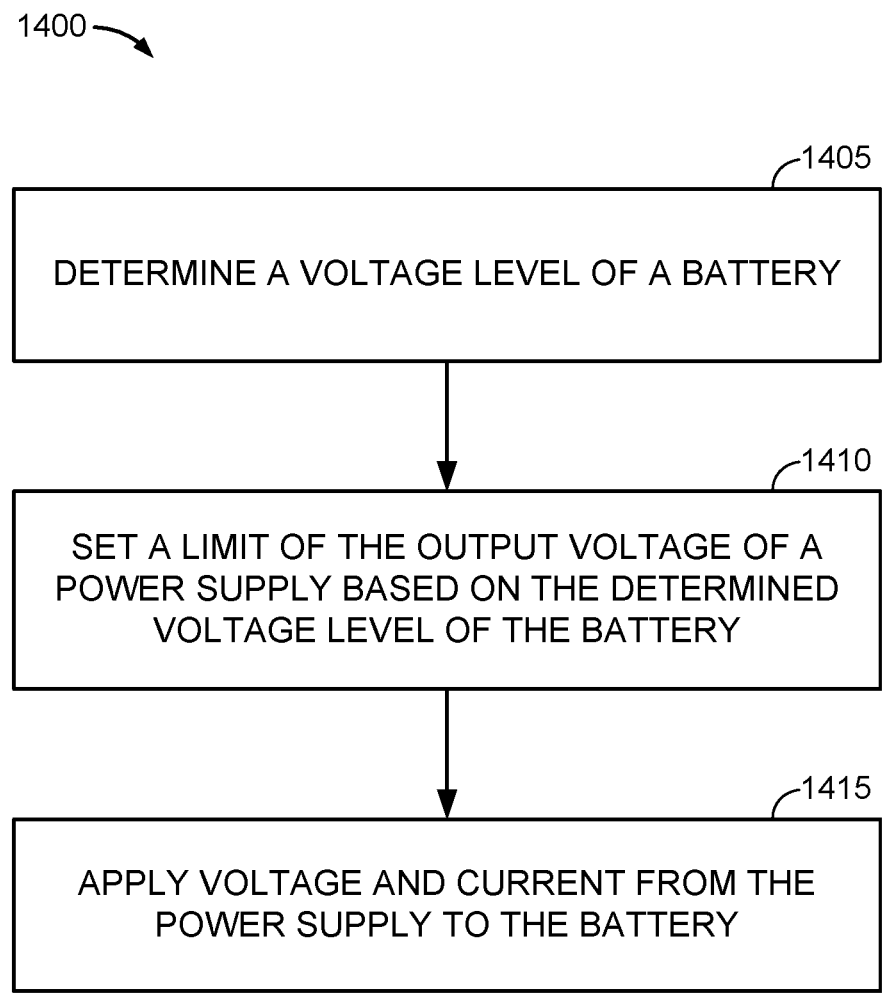
FIG. 14 is a flowchart of example operations for operating a voltage controlled battery charger, in accordance with certain aspects of the present disclosure.

FIG. 14 is a flowchart of example operations 1400 for operating a voltage controlled battery charger, in accordance with certain aspects of the present disclosure.

At 1405, a voltage level of a battery is determined. For example, a charger controller of the battery charger determines a voltage level of the battery. At 1410, a limit of the output voltage of a power supply is set based on the determined voltage level of the battery. For example, a charger controller of the battery charger may set a voltage level to one of a trickle voltage, pre-charge voltage, voltage of the battery, or a constant voltage based on the voltage level of the battery. In particular, each of the trickle voltage, pre-charge voltage, voltage of the battery, or a constant voltage may be associated with one or more thresholds as discussed herein. At 1415, voltage and current from the power supply is regulated and applied to the battery. For example, the charger controller may control one or more switches to selectively apply voltage and current to the battery based on limits for charging the battery.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A voltage controlled charge pump comprising:
   a voltage input terminal;
   a voltage output terminal;
   a plurality of switches coupled between the voltage input terminal and the voltage output terminal;
   a first capacitor coupled between at least a first switch and a second switch of the plurality of switches and further coupled between at least a third switch and a fourth switch of the plurality of switches;
   a second capacitor coupled to the voltage output terminal;
   a controller configured to selectively open and close the plurality of switches;
   a feedback path from at least one of the voltage output terminal, the first capacitor, and the second capacitor to the controller, wherein the controller is configured to selectively open and close the plurality of switches based on a voltage on the feedback path; and
   a linear regulator comprising a battery charger coupled to the voltage output terminal and further coupled to a battery so that the linear regulator is coupled between the plurality of switches and the battery and further so that the linear regulator is coupled between the feedback path and the battery, the linear regulator being configured to:
   determine a voltage level of the battery;

set a limit of an output voltage at the voltage output terminal based on the determined voltage level of the battery; and selectively apply the output voltage to the battery.

2. The voltage controlled charge pump of claim 1, wherein the first switch, second switch, third switch, and fourth switch comprise a first transistor, a second transistor, a third transistor, and a fourth transistor, respectively.

3. The voltage controlled charge pump of claim 1, wherein the controller is configured to selectively control the plurality of switches to couple the first capacitor between the voltage input terminal and the voltage output terminal in a charging mode, and to couple the first capacitor between a reference potential and the voltage output terminal in a discharging mode.

4. The voltage controlled charge pump of claim 3, wherein the controller is configured to modify a duration of the charging mode based on the voltage on the feedback path.

5. The voltage controlled charge pump of claim 4, wherein the controller is configured to modify the duration of the charging mode based on whether the voltage on the feedback path is below a first threshold.

6. The voltage controlled charge pump of claim 5, wherein the controller is configured to modify the duration of the charging mode based on whether the voltage on the feedback path is above a second threshold.

7. The voltage controlled charge pump of claim 3, wherein the controller is configured to modify a duration of the discharging mode based on the voltage on the feedback path.

8. The voltage controlled charge pump of claim 7, wherein the controller is configured to modify the duration for the discharging mode based on whether the voltage on the feedback path is below a first threshold.

9. The voltage controlled charge pump of claim 1, wherein the feedback path comprises a comparator configured to compare the voltage of at least one of the voltage output terminal, the first capacitor, and the second capacitor to a reference output voltage, and wherein the controller is configured to selectively open and close the plurality of switches based on the comparison.

10. The voltage controlled charge pump of claim 1, wherein the controller is configured to control a duty cycle of the plurality of switches based on the voltage on the feedback path.

11. The voltage controlled charge pump of claim 1, wherein a switching frequency of the plurality of switches is based on a load on the voltage output terminal.

12. The voltage controlled charge pump of claim 1, further comprising:
a resonator; and
an AC/DC converter with an input coupled to an output of the resonator, wherein the voltage input terminal is further coupled to an output of the AC/DC converter.

13. The voltage controlled charge pump battery charger of claim 1, wherein the linear regulator is configured to set the limit of the output voltage based on the voltage level of the battery when the voltage level of the battery is above a first threshold and below a second threshold, and wherein the linear regulator is configured to set the limit of the output voltage to a constant voltage level when the voltage level of the battery is above the second threshold.

14. The voltage controlled charge pump of claim 13, wherein the output voltage at the voltage output terminal is controlled based on a comparison of a voltage indicative of the output voltage to the limit.

15. A method for operating a voltage controlled charge pump, the method comprising:
selectively operating the voltage controlled charge pump in a bypass mode wherein an output voltage of the voltage controlled charge pump substantially equals an input voltage of the voltage controlled charge pump;
selectively operating the voltage controlled charge pump in an active mode wherein the output voltage of the voltage controlled charge pump is controlled based on a comparison of a voltage indicative of the output voltage to a threshold voltage;
determining, by a linear regulator comprising a battery charger, a voltage level of a battery;
setting, by the linear regulator, a limit of the output voltage based on the determined voltage level of the battery; and
selectively applying, by the linear regulator, the output voltage to the battery, wherein:
the charge pump comprises:
a voltage input terminal;
a voltage output terminal;
a plurality of switches coupled between the voltage input terminal and the voltage output terminal;
a first capacitor coupled between at least a first switch and a second switch of the plurality of switches and further coupled between at least a third switch and a fourth switch of the plurality of switches; and
a second capacitor coupled to the voltage output terminal; and
the linear regulator is coupled to the voltage output terminal and further coupled to the battery so that the linear regulator is coupled between the plurality of switches and the battery and further so that the linear regulator is coupled between a feedback path and the battery.

16. The method of claim 15, wherein selectively operating the voltage controlled charge pump in the active mode comprises opening and closing the plurality of switches of the charge pump based on the voltage indicative of the output voltage.

17. The method of claim 15, wherein selectively operating the voltage controlled charge pump in the active mode comprises selectively operating the charge pump in a charging mode and a discharging mode based on the voltage indicative of the output voltage.

18. The method of claim 17, wherein in the charging mode, one or more capacitors of the voltage controlled charge pump are charged, and wherein in the discharging mode, the one or more capacitors of the voltage controlled charge pump are discharged.

19. The method of claim 17, further comprising modifying a duration of the charging mode based on the voltage indicative of the output voltage.

20. The method of claim 19, further comprising modifying the duration of the charging mode based on whether the voltage indicative of the output voltage is below a first threshold.

21. The method of claim 20, further comprising modifying the duration of the charging mode based on whether the voltage indicative of the output voltage is above a second threshold.

22. The method of claim 17, further comprising modifying a duration of the discharging mode based on the voltage indicative of the output voltage.

23. The method of claim 22, further comprising modifying the duration for the discharging mode based on whether the voltage indicative of the output voltage is below a first threshold.

24. A voltage controlled charge pump comprising:
- means for selectively operating the voltage controlled charge pump in a bypass mode wherein an output voltage of the voltage controlled charge pump substantially equals an input voltage of the voltage controlled charge pump;
- means for selectively operating the voltage controlled charge pump in an active mode wherein the output voltage of the voltage controlled charge pump is controlled based on a comparison of a voltage indicative of the output voltage to a threshold voltage;
- a linear regulator comprising a battery charger, the linear regulator being configured to:
  - determine a voltage level of a battery;
  - set a limit of an output voltage at a voltage output terminal based on the determined voltage level of the battery; and
  - selectively apply the output voltage to the battery,
wherein:
  the charge pump comprises:
   a voltage input terminal;
   the voltage output terminal;
   a plurality of switches coupled between the voltage input terminal and the voltage output terminal;
   a first capacitor coupled between at least a first switch and a second switch of the plurality of switches and further coupled between at least a third switch and a fourth switch of the plurality of switches; and
   a second capacitor coupled to the voltage output terminal; and
  the linear regulator is coupled to the voltage output terminal and further coupled to the battery so that the linear regulator is coupled between the plurality of switches and the battery and further so that the linear regulator is coupled between a feedback path and the battery.

25. The voltage controlled charge pump of claim 1, wherein the controller is configured to selectively open and close the plurality of switches at a frequency and duty cycle other than 50% so the output voltage is not equal to an input voltage on the voltage input terminal and not equal to half of the input voltage.

26. The voltage controlled charge pump of claim 1, wherein the controller is configured to use pulse width modulation to selectively open and close the plurality of switches based on the voltage on the feedback path.

* * * * *